United States Patent [19]

Fukatsu et al.

[11] 3,974,522

[45] Aug. 10, 1976

[54] ELECTRONIC EDITING METHOD AND APPARATUS FOR A VIDEO TAPE RECORDER

[75] Inventors: Motonori Fukatsu; Tatsumi Nakano, both of Tokyo, Japan

[73] Assignee: Akai Electric Company Limited, Tokyo, Japan

[22] Filed: Apr. 4, 1975

[21] Appl. No.: 565,195

Related U.S. Application Data

[63] Continuation of Ser. No. 382,912, July 26, 1973, abandoned.

[52] U.S. Cl. ............................. 360/14; 360/60; 360/74
[51] Int. Cl.² ..................................... G11B 27/00
[58] Field of Search ............. 360/14, 60, 74, 83, 360/90

[56] References Cited
UNITED STATES PATENTS

| | | | |
|---|---|---|---|
| 3,180,930 | 4/1965 | Bounsall | 360/14 |
| 3,248,030 | 4/1966 | Ganzhorn | 360/74 |
| 3,353,007 | 11/1967 | Combs | 360/74 |
| 3,488,058 | 1/1970 | Staar | 360/60 |

FOREIGN PATENTS OR APPLICATIONS

| | | | |
|---|---|---|---|
| 17,950 | 12/1969 | Japan | 360/14 |

*Primary Examiner*—Vincent P. Canney
*Assistant Examiner*—Alan Faber
*Attorney, Agent, or Firm*—Oblon, Fisher, Spivak, McClelland & Maier

[57] ABSTRACT

A method and apparatus for a video tape recorder to record a new video signal successively to an old video signal prerecorded on a magnetic tape for editing a magnetic recording in such a manner that, when played back, no picture disturbance is produced at the edited transition of the tape. An end part of the tape bearing recorded information is rewound upon completion of recording thereof. Prior to the recording of a new video signal, the rewound part of the tape is played back to pick up control signals therefrom and the phase of the latter is compared with that of vertical synchronizing signals contained in the new video signal. Upon coincidence of these phases with each other, the operational mode of the video tape recorder is switched from playback to recording and actual recording of the new video signal is commenced. When the magnetic tape thus edited is played back, no picture disturbance results at the edited transition of the tape and desirable pictures can be obtained.

1 Claim, 10 Drawing Figures

ELECTRONIC EDITING METHOD AND APPARATUS FOR A VIDEO TAPE RECORDER

This is a continuation, of application Ser. No. 382,912, filed July 26, 1973, now abandoned

BACKGROUND OF THE INVENTION

1. Field of the Invention

The present invention generally relates to the editing of a magnetic recording of a video signal, and more particularly to an electronic editing method and apparatus for video tape recorders wherein a video signal is recorded successively onto a prerecorded video signal existing on a magnetic tape (hereinafter referred to as "prerecorded video signal" or "old signal" in the specification) in such a manner that, when played back, no picture disturbance is produced.

2. Description of the Prior Art

Electronic editing systems are utilized in video tape recorders for domestic use as well as broadcasting use. In the past, there have been two kinds of such electronic editing systems, one being an "insert editing system" in which a new viedo signal was inserted in the old video recording and the other being an "assembly editing system" in which a new video signal was recorded successively to the prerecorded video signal with continuity. The former editing system was principally utilized with television broadcasting techniques and the latter editing system was utilized both in such broadcasting use and in domestic use. In both uses, however, recording of a new video signal had to be commenced under the strict condition that no difference of phase existed or precise synchronism had to be ensured between the old prerecorded video signal and the new video signal. If any such difference existed therebetween, synchronism of the signals was disturbed at an edited transition of a tape with the result that a picture would also be disturbed in the played back image.

At the initial stage of such an editing technique, an editing of a magnetic recording was mechanically accomplished by a method in which the tape was cut at a proper point of the recorded video signal and tape segments were spliced together to provide an edited tape. Subsequent to such mechanical editing, an electronic editing technique was proposed whereby in order to record a new video signal successively to the old video signal prerecorded on a magnetic tape, the control signals also recorded on the magnetic tape coincidentally with the old video signal were picked up in a playback mode and compared in phase with vertical synchronizing signals contained in the new video signal. Any phase difference thus obtained served to control capstan servos so that the running speed of the magnetic tape was so adjusted as to bring the control signals in phase with the synchronizing signals and, upon coincidence of the phases therebetween, the operational mode of the video tape recorder was switched from a playback mode to a recording mode to start the actual recording of the new video signal. In this way, electronic editing was successfully accomplished. When the magnetic tape thus edited was played back, no appreciable disturbance of synchronism was recognized at the edited transition of the tape because of complete coincidence of phases between the old and the new video signals. Thus, the desired playback picture was obtained.

In the electronic editing technique above outlined, it was necessary to playback the magnetic tape recording containing the old video signal to pick up the control signals. In the "insert" editing operation wherein the new video signal was inserted in the old video signal, the control signals were already recorded with the old video signal on the section of the magnetic tape on which the new video signal was to be recorded, and therefore no rewinding of the magnetic tape was needed to pick up the control signals so that only playback was therefore sufficient. In the "assembly" editing operation wherein a new video signal was recorded successively to the end of an old video signal prerecorded on the tape, no video signal was contained or only the video signal recorded prior to the old video signal was contained in the section of the tape on which the new video signal was to be recorded, and therefore no usable control signals for electronic editing could be picked up.

In such an assembly editing operation, there has been no proposal as to how to realize the editing operation, except in some technical publications suggesting that a part of the magnetic tape containing the old video signal was first rewound and then played back to pick up the control signals. These publications, however, did not disclose when or how rewinding of the magnetic tape was commenced, much less how such rewinding period or the rewound length of the tape was determined.

SUMMARY OF THE INVENTION

Accordingly, one object of the present invention to provide a new and improved unique video tape recorder and method for conducting an assembly editing operation.

Another object of the present invention is to provide a new and improved unique video tape recorder and method of electronic editing which enables a subsequent recording to not start during the rewinding period of a part of the magnetic tape for the purpose of assembly editing.

Still another object of the present invention is to provide a new and improved unique video tape recorder and method of electronic editing in which a part of a magnetic tape is automatically rewound and such rewinding is automatically completed.

Yet another object of the present invention is to provide a new and improved unique video tape recorder and method for electronically providing an editing operation without picture disturbance.

Briefly, in accordance with this invention, the foregoing and other objects are in one aspect attained by the provision of a method and apparatus for rewinding a part of a magnetic tape for an assembly editing operation as soon as the recording of a first video signal has been completed on the tape. It is to be noted that such rewinding is not effected just before the recording of the new video signal is started. The rewinding of the tape upon completion of the recording according to the invention provides a quick subsequent recording operation of video tape recorders and increases the utility thereof. A part of the magnetic tape is automatically rewound for electronic editing at every completion of a recording operation and the rewinding operation of the video tape recorder is automatically stopped when a predetermined length of the tape has been rewound. The length of the tape as rewound is mechanically and/or electrically determined. Thus, the video signal recorder automatically becomes ready for recording a new video signal.

In the present invention, means are also needed for preventing the recording of the new video signal from starting the rewinding period of the magnetic tape and immediately upon completion of the rewinding operation. These means are incorporated in an electrical operation circuit of the invention.

BRIEF DESCRIPTION OF THE DRAWINGS

A more complete appreciation of the invention will be readily obtained as the same becomes understood by reference to the following detailed description when considered in connection with the accompanying drawings, wherein.

DETAILED DESCRIPTION OF THE PREFERRED EMBODIMENTS

Figure 1:
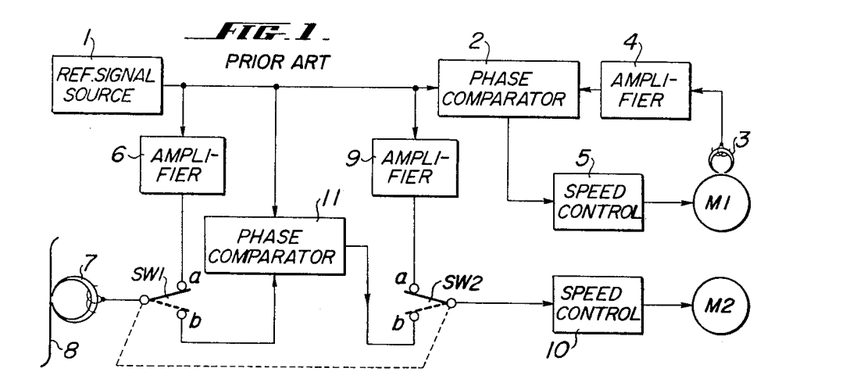
FIG. 1 is a block diagram representing a prior art electroniic editing apparatus.

Referring now to the drawings, wherein like reference numerals designate identical or corresponding parts throughout the several views and more particularly to FIG. 1 thereof, a block form of a typical servo system used for electronic editing employed in a video tape recorder of a rotary head type or a helical scan type is shown. In the drawing, M1 and M2 designate electric motors for the rotary driving of magnetic heads and a capstan. Reference numeral 1 designates a reference signal source which generates a reference signal associated with vertical synchronizing signals contained in the television signal received from an antenna or a television camera. The reference signal derived from the reference signal source 1 is applied to a phase comparator 2. The number of revolutions of the magnetic head motor M1 is picked up by a magnetic head 3 arranged in the neighborhood thereof, and a corresponding signal is applied through an amplifier 4 to the phase comparator 2 where the signal is compared in phase with the reference signal supplied from the reference signal source 1. An output of the difference between these two signals is derived from the comparator 2 and serves to keep the rotation speed of the motor M1 constant through a speed control 5. Thus, a magnetic head servc system of a video tape recorder is provided.

On the other hand, the reference signal from the signal source 1 is applied to a control head 7 through an amplifier 6 and a switch SW1 in a recording mode of the video tape recorder so that control signals are recorded on a magnetic tape 8 in a manner well known in the art. At the same time, the reference signal serves to keep the rotational speed of the capstan motor M2 constant through an amplifier 9, a speed control 10 and a switch SW2 arranged to be switched in association with the switch SW1. These switches SW1 and SW2 are switched so as to make contact with contacts a and b in recording and playback modes of the tape recorder, respectively, as will be described hereinafter.

In a playback mode, control signals, recorded on the magnetic tape 8, are picked up by the control head 7 and compared in phase with the reference signal in a phase comparator 11, whose output controls the rotational speed of the capstan motor M2 through the speed control 10. Namely, the phase of the reproduced control signals is compared with that of the reference signal and the rotational speed of the capstan motor M2 is controlled until the phase difference becomes zero or coincidence of the phases is obtained. Thus, the capstan servo system is provided.

In order to realize the electronic editing, for example, an insert editing, with such a video tape recorder as provided with the servo systems above outlined, it is necessary to pick up the control signals prerecorded on the magnetic tape, to compare the phase of the control signals thus picked up with that of the vertical synchronizing signals contained in the second video signal to be inserted after the old video signal in the phase comparator 11 and to control the rotational speed of the capstan motor M2 in response to the phase difference output of the comparator 11. Upon coincidence of the phases between both signals, the operational mode of the video tape recorder is switched from playback to recording and the switches SW1 and SW2 are switched from the contact b to the contact a. This results in that the new video signal is recorded successively onto the first video signal in such a manner that no picture disturbance is produced at the edited transition in a playback mode. In an actual application, such switching of the operation mode is not effected as soon as the control signals have just been in phase with the vertical synchronizing signals contained in the new video signal, but rather are automatically effected after a predetermined time has elasped which is equal to or longer than the interval required for the phases of the signals to coincide with each other after temporary playback is started for electronic editing. Such a switching is realized by means of mechanical or electronic switching means such as relays or AND gates of conventional structure as well known in the art.

Figure 2:
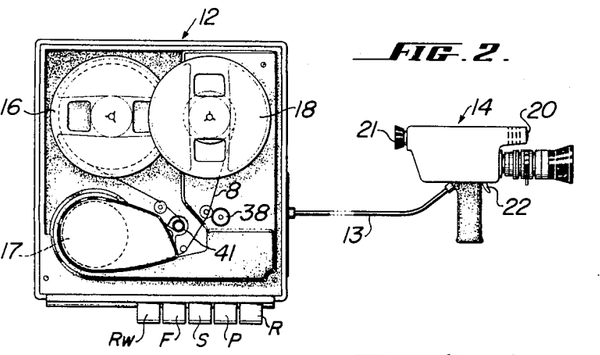
FIG. 2 is a diagrammatic illustration of a video tape recording apparatus capable of electronically editing a magnetic recording according to this invention.

FIG. 2 is a diagrammatic illustration of a video tape recorder set capable of realizing the electronic editing according to this invention. The video tape recorder set as illustrated is composed of a video tape recorder 12 and a video camera 14 adapted to electrically connect therewith through a connecting cable 13. The recorder 12 itself is of conventional configuration except for the rewinding mechanism hereinafter described with reference to FIGS. 3 and 4, and the magnetic tape 8 is transported from a supply reel 16 to a take-up reel 18, helically wrapping about a head drum 17. Operational modes of the recorder 12 are controlled by a series of push buttons indicated as Rw, F, S, P and R in the drawing. The video camera 14 is also of the conventional configuration equipped with a microphone 20, a view-finder 21 and a starting lever 22.

Figure 3:
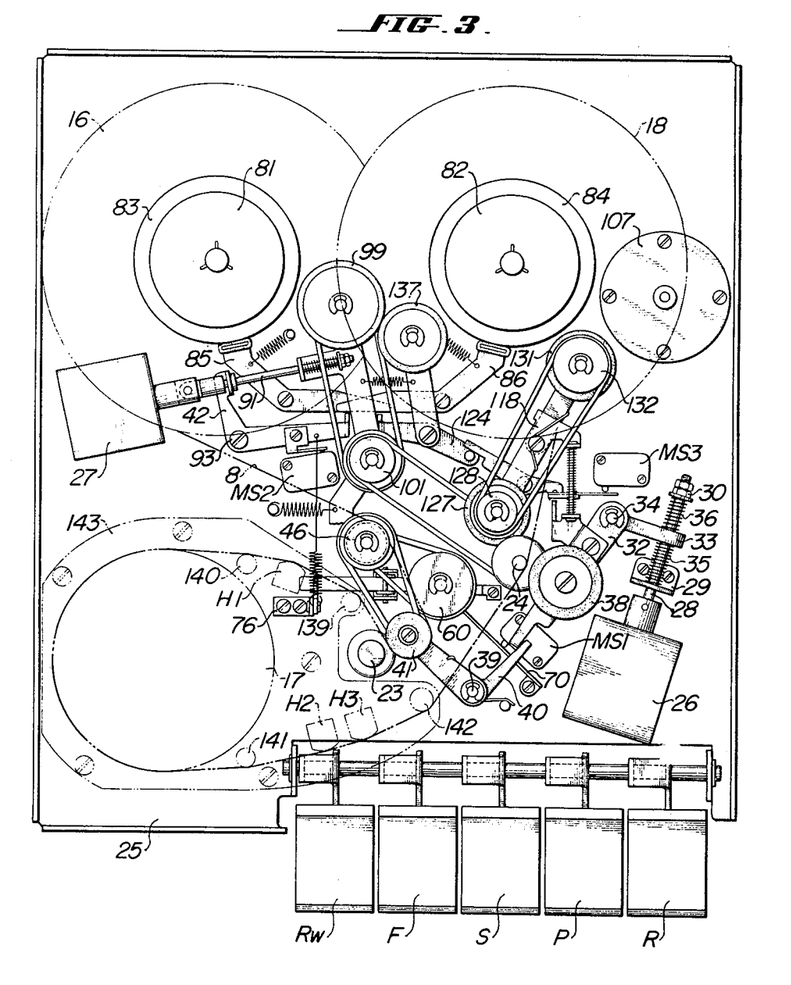
FIG. 3 is a plan view of a tape transportation mechanism and a tape rewinding mechanism of a video tape recorder according to the invention.

Reference is now made to FIG. 3 illustrating a tape driving mechanism and a tape rewinding mechanism incorporated in the recorder 12 shown in FIG. 2.

Mounted on a chassis 25 of the tape recorder 12 are two plungers 26 and 27, the former being intended for driving the tape transporting mechanism and the latter for driving the tape rewinding mechanism for electronic editing. An actuating rod 28 of the plunger 26 is loosely supported by an angle member 29 also secured on the chassis 25, and has a pair of nuts 30 screwed at its tip. A pinch roller arm 32 is pivotably mounted by a pin 34 on the chassis 25 with its arm 33 passing the actuating rod 28 of the plunger 26 through an opening provided on an end thereof. Springs 35 and 36 are interposed between the angle member 29 and the arm 33 and between the arm 33 and the nuts 30, respectively, surrounding the actuating rod 28. At the center of the pinch roller arm 32, a pinch roller shaft 37 stands upwardly with which a main pinch roller 38 engages rotatably. The main pinch roller 38 of a conventional type which has a sleeve bearing made of oil impregnated metal at its center. The end of the pinch roller arm 32 is formed narrowly and positioned so as to make contact with one end of an L-shaped lever 40 pivotably mounted on the chassis by a pin 39. A sub-pinch roller 41, which cooperates with a sub-capstan 23, is rotatably mounted on the other end of the lever 40. A wire spring 42 is arranged around the pin 39 with one end thereof engaged with one arm of the lever 40 and the other end engaged with a pin 43 studded on the chassis 25, and serves to turn the lever 40 counterclockwise.

Figures 6, 7:
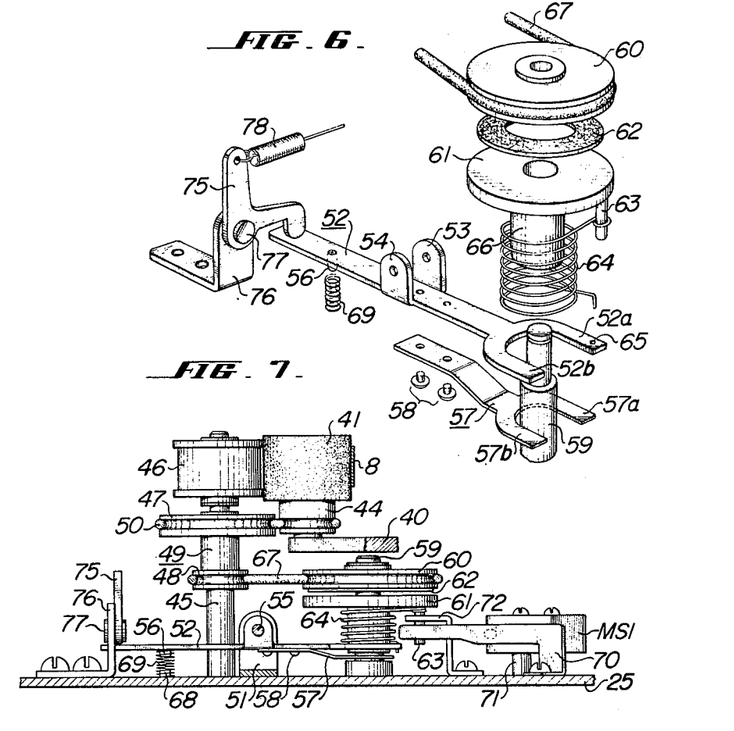
FIG. 6 is a partially exploded perspective view of the mechanism for determining the length of a rewound magnetic tape.
FIG. 7 is a side view of the mechanism shown in FIG. 6.

As better shown in FIG. 7, a lower smaller portion 44 of the sub-pinch roller 41 is formed with a groove for a driving belt. A shaft 45 fixed on the chassis 25 has a smaller diameter at its upper half part, on which rotatably mounted a tape guide roller 46 and a two stage pulley 49 consisting of two pulleys 47, 48 with different diameters. Both pulleys 47 and 48 are formed with grooves for driving belts and the larger pulley 47 is associated with the sub-pinch roller 41 by a belt 50.

A U-shaped support 51 is secured on the chassis 25 in a known manner and a rocking lever 52 is supported by the support 51 with a pair of upstanding arms 53 and 54 supported by a pin 55 on the upper part of the support 51 (See FIG. 6). The front end of the rocking lever 52 is bifurcated as at 52a and 52b as perspectively shown in FIG. 6. On the lower side of the rocking lever 52, a short pin 56 extends downwardly and a thin plate 57 with its front end also bifurcated as at 57a and 57b is secured by a pair of rivets 58. The thin plate 57 is downwardly bent at its front half so as to be spaced from the rocking lever 52 in order to provide a spring action.

A shaft 59 extends upward from the chassis 25 and an upper part thereof is made slender on which a pulley 60 is rotatably mounted. A disk plate 61 is also mounted on the shaft 59 below the pulley 60. The pulley 60 has a felt ring 62 attached on a lower side thereof. The disk plate 61 has a projection 63 extending downwardly from a lower side thereof and a coil spring 64 is disposed between the disk plate 61 and the front end of the rocking lever 52 with one end of the spring 64 being engaged with the projection 63 and the other end being engaged with a hole 65 provided on one of the bifurcated legs 52a and 52b. It is to be noted that the distance between both bifurcated legs 52a and 52b of the rocking lever 52 should be selected larger than the diameter of the bearing portion 66 of the disk plate 61 but smaller than the diameter of the spring 64, so that the spring may be supported by the legs 52a and 52b. Similarly, it is to be noted that the distance between both bifurcated legs 57a and 57b of the thin plate 57 should be selected larger than the diameter of the lower part of larger diameter of the shaft 59 but smaller than the diameter of the bearing portion 66 of the disk plate 61 may be moved upwardly as hereinafter described. The pulley 60 is driven by the pulley 48 through a driving belt 67. A coil spring 69 is disposed between a short pin 68 fixed on the chassis 25 (See FIG. 7) and the pin 56 fixed on the lower side of the rocking lever 52.

An elongate spring plate 70 is secured on the chassis 25 in a known manner and extends laterally until a front end thereof reaches under the disk plate 61. When the plate 70 is urged by the projection 63 provided on the lower side of the disk plate 61 upon a substantial one counterclockwise revolution thereof, a microswitch MS1 supported by a shaft 71 on the chassis 25 is actuated. A stop member 72 is secured to the chassis 25 in a well-known manner for stopping the projection 63 at a predetermined position.

An L-shaped actuating lever 75 is mounted through an angle member 76 on the chassis 25 in the vicinity of the rear end of the rocking lever 52 and is rotatable at a pin 77 with respect to the angel member 76. One end of the actuating lever 75 is engaged with one end of a coil spring 78 and the other end of the lever 75 is hung so as to press down the rear end of the rocking lever 52.

Figure 4:
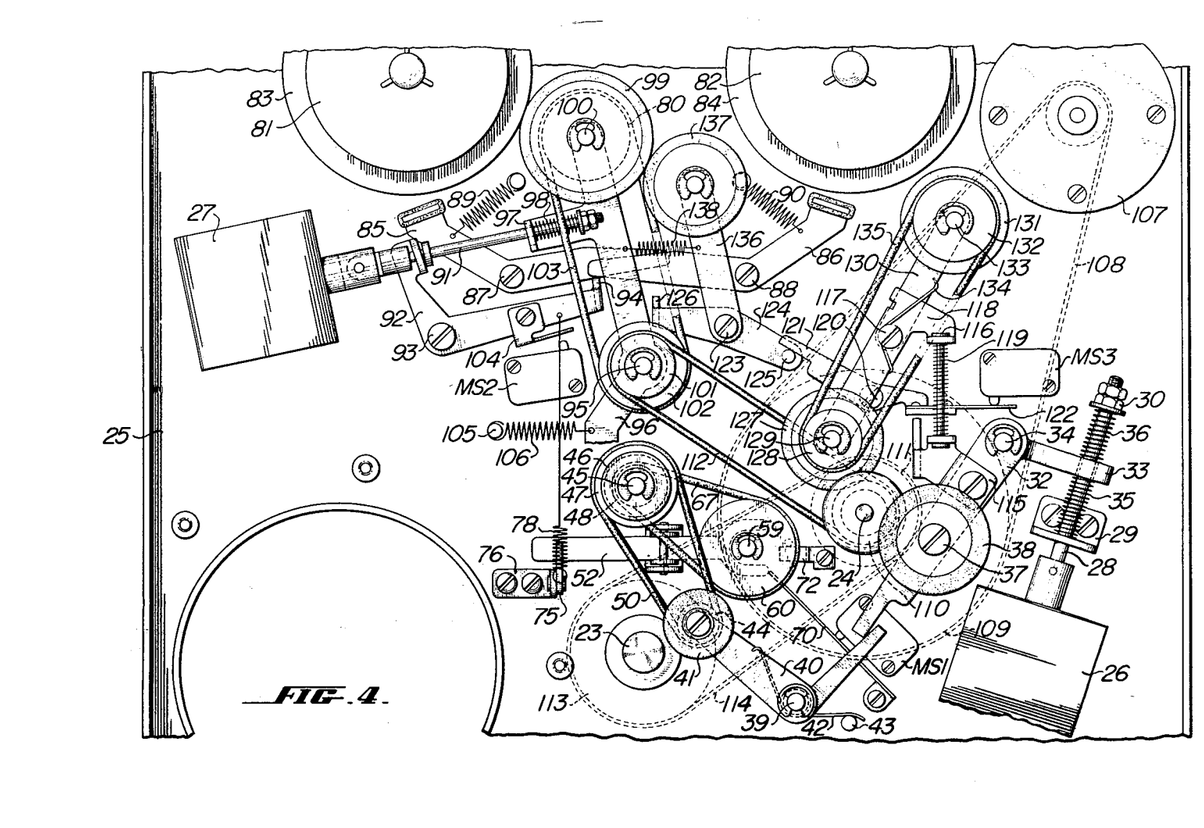
FIG. 4 is a partial enlarged plan view of the mechanism shown in FIG. 3.

Turning again to FIG. 3 and referring to FIG. 4, reel tables 81 and 82 on which a supply reel 16 and a take-up reel 18 are mounted, respectively, are secured to driving drums 83 and 84, respectively. A pair of brake levers 85 and 86 are pivotably mounted by a pair of pins 87 and 88 on the chassis 25 so that the respective ends of the levers 85 and 86 are urged against the lateral peripheries of the driving drums 83 and 84. These brake levers 85 and 86 are pulled towards each other by springs 89 and 90, respectively, one end of each engaging with the front parts of the levers. The rear parts of the levers overlap each other.

The second plunger 27 is mounted on the chassis 25 in the vicinity of the supply reel 16, and one end of an L-shaped lever 92 which is pivotably mounted by a pin 93 on the chassis 25, is engaged with the rear part of the actuating rod 91 of the second plunger 27. The other end of the lever 92 is downwardly bent to provide a tab 94, which is positioned to press the other respective ends of the brake levers 85 and 86. A coil spring 98 and the arm 97 of a lever 96 pivotably mounted by a pin 95 on the chassis 25 are engaged with the front part of the actuating rod 91 of the second plunger 27. The lever 96 is shown as partially cut away in FIGS. 3 and 4 for simplicity of illustration. A pulley 80 united with a rewinding idler 99 is rotatably mounted by a pin 100 on one end of the lever 96 and a smaller diameter pulley 101 and a larger diameter pulley 102 are rotatably mounted on the same pin 95. The pulley 80 and the pulley 102 are coupled together through a driving belt 103. A spring plate 104 is secured to the center of one of the sides of the L-shaped lever 92 in such a position that the plate 104 may actuate a microswitch MS2 disposed in the vicinity of the lever 92 on the chassis 25. The same side of the lever 92 is engaged with the other end of the coil spring 78 one end of which engages with the actuating lever 75 as above mentioned. A coil spring 106, one end of which is engaged with a pin 105 on the chassis 75, engages with the lever 96 at its other end so that the lever 96 may be pulled clockwise with respect to the pin 95.

Referring now to FIG. 4, a main capstan 24 is secured to a flywheel 109 driven by an electric motor 107 through a driving belt 108, and cooperates with the main pinch roller 38 to transport the magnetic tape 8 in a recording mode and a playback mode. A pulley 110 and a larger diemeter pulley 111 are secured to the capstan 24, and the pulley 110 is coupled with the pulley 101 of a smaller diameter through a driving belt 112. Another pulley 111 is coupled with a pulley 113 secured to the sub-capstan 23 by a driving belt 114.

One end of a rod 116 engages with a part of the bent arm 115 fixed on the pinch roller arm 32 and the other end of the rod 116 engages with one end of an L-shaped lever 118 pivotably mounted by a pin 117 on the chassis 25. A spring 119 is disposed around the rod 116 between the arm 115 and the lever 118. The arm 115 has a downwardly bent portion which is positioned to be able to push one end of a lever 121 pivotably mounted by a pin 120 on the chassis 25. Mounted on one end of the lever 121 is a spring plate 122 which can actuate a microswitch MS3 positioned in the vicinity thereof on the chassis 25. The other end of the lever 121 is made slender and positioned to push a pin 125 secured on a lever 124 pivotably mounted by a pin 123 on the chassis 25. The lever 124 is provided at the other end thereof with a tab 126 similar to the tab 94 and the tab 126 positioned to push the rear end of the brake levers 85 and 86. On the other end of the L-shaped lever 118, a driving idler 127 with a rubber ring on its periphery and a pulley 128 of smaller diameter are rotatably mounted by a pin 129. A lever 130 is rotatably mounted by a pin 117 on the chassis 25 at its one end, and, at the other end of the lever 130, a driving idler 131 with a rubber ring on its periphery and a pulley 132 of smaller diameter are rotatably mounted by a shaft 133. The lever 130 is energized to turn counterclockwise with respect to the L-shaped lever 118 by a wire spring 134 arranged around the pin 117; however, it is prevented from such turning by a hanging portion of the lever 118.

Rotation of the pulley 128 is transmitted to the pulley 132 by a driving belt 135. An idler 137 with a rubber ring on its periphery is rotatably mounted on the other end of a lever 136 pivotably mounted at the center of the lever 124 by the pin 123. The lever 136 is always pulled towards the lever 96 by a spring 138 provided therebetween, so that the rewinding idler 99 is maintained in a close contact with the idler 137.

Along the running path of the magnetic tape 8, tape guide rollers 139, 140, 141 and 142 and magnetic heads H1, H2, H3 and H4 are located. Reference numeral 143 designates a head mount mounted on the chassis 25 in a known manner, on which a rotary head is to be mounted.

Explanation will now be given to the electric circuitry for operating the rewinding mechanism of the present invention by reference to FIG. 5.

When recording or playback is desired, the first plunger 26 which serves to bring the pinch rollers 38 and 41 into cooperation with the capstans 24 and 23, respectively, is supplied with a current from a d.c. power source 15 through a switch means S1 actuated to close by the second plunger 27 as hereinafter described, a switch means S2 adapted to close by depression of recording button R at recording time and a switch means S3 adapted to close by triggering the starting lever 22 of the video camera 14 shown in FIG. 2. When playback is desired, the first plunger 26 is supplied with a current from the d.c. power source 15 through a switch means S4 which is actuated to close by the push button P in only a playback mode. A switch means S5 is connected in parallel to the switch means S3 for selecting reception of a signal either from a video camera or from a television station.

The second plunger 27 which serves to drive the rewinding mechanism, is supplied with a current from the d.c. power source 15 through the switch means S1 switched to its contact a or b by the plunger 27 itself, switch means S6 and S8 being closed by a recording push button R in a recording mode and a normally closed switch means S7 being opened upon completion of a rewinding operation. The second plunger 27 is also arranged to be supplied with a current from the power source 15 through a switch means S9 switched to its contact a or b by the first plunger 26. A transistor Q1 and the switch means S6 and S7, and a self-holding means is thus provided for the plunger 27. The transistor Q1 has a base electrode connected through a capacitor C1 to the junction between resistors R1 and R2, both of which are connected in series between an emitter electrode of the transistor and the ground, and a diode D1 is connected between the emitter electrode and the base electrode of the transistor with the cathode connected with the emitter electrode and the anode connected with the base electrode.

In parallel with the first plunger 26, a transistor Q2, a transistor Q3 whose emitter electrode is connected with the collector electrode of the transistor Q2 and resistors R3 and R4 are connected in series. The transistor Q2 has a base electrode connected through a parallel connection of a diode D2 and a resistor R5 to the ground and an emitter electrode also grounded through a resistor R6. A capacitor C2 is connected between the base and emitter electrodes of the transistor Q2. The resistance of the resistor R5 is selected to be considerably larger than that of the resistor R6 for the reason hereinafter described. The transistor Q3 has an emitter electrode connected through resistors R7 and R8 to the ground and a base electrode connected through a capacitor C3 to the junction between the resistors R7 and R8. Connected between the base emitter electrodes of the transistor Q3 is a diode D3 whose cathode is connected with the emitter electrode and whose anode is connected to the base electrode. A resistor R9 is connected in parallel with the resistors R7 and R8.

Also in parallel with the first plunger 26, a diode D4 and a transistor Q4 are connected in series with each other, with the anode of the diode D4 connected to the collector electrode of the transistor Q4. The transistor Q4 has a base electrode connected to the junction between the resistors R3 and R4 and an emitter electrode thereof is grounded. The anode of the diode D4 is also connected to the center tap of the winding of the first plunger 26.

Operation of the tape driving mechanism in a recording mode of the video tape recorder according to this invention will now be described with reference to the accompanying drawings and the description is directed to the electronic editing started by a manual operation of the starting lever 22 of the video camera 14.

Figure 5:
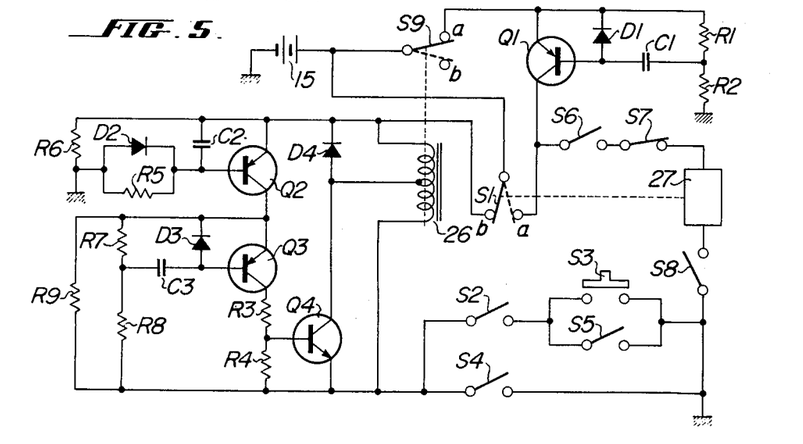
FIG. 5 is a schematic diagram of an electrical operation circuit which may be employed in the apparatus of this invention.

Reference is now made to FIGS. 3, 4 and 5. When recording is desired, the recording push button R of the recorder is depressed prior to the recording to close the switch means S2, S6 and S8. Under such a condition, when the starting lever 22 of the video camera 14 is triggered, the switch means S3 is closed and thus the first plunger 26 is energized. Upon energization of the plunger 26, the pinch roller arm 32 is turned clockwise and the main pinch roller 38 is pushed against the main capstan 24. At the same time, the levers 121 and 124 are turned by the bent arm 115 with the result that the brake levers 85 and 86 are turned so that the braking force which has been applied to the driving drums 83 and 84 is released and the driving idler 131 is pushed against the driving drum 84 through the L-shaped lever 118 and the lever 130. The reel table 82 is thus rotated in a normal direction through the driving belt 135, the driving idler 127, the pulley 110 and the flywheel 109 by the electronic motor 107 and the magnetic tape 8 is transported in a normal direction at a normal speed with cooperation of the main pinch roller 38 with the main capstan 24.

At this time, the L-shaped lever 40 is turned counterclockwise by the spring 42, and the sub-pinch roller 41 mounted on one end of the lever 40 is pushed against the sub-capstan 23 driven through the driving belt 114 by the motor 107 and the magnetic tape 8 is put therebetween. In this way, recording is commenced with the help of the magnetic heads H1, H2 and H3 and continued for a desired period of time. Rotation of the sub-pinch roller 41 is transmitted to the pulley 47 through the driving belt 50 and further to the pulley 60 through the driving belt 67.

When it is desired to finish the recording operation, an operator releases the starting lever 22 of the video camera 14. As a result, the switch means S3 of FIG. 5 is opened and the first plunger 26 is deenergized, so that the switch means S9 which has been in contact with the contact $b$ is switched to make contact with the contact $a$. This results in that the transistor Q1 is made conductive during the period within which a base current flows through the capacitor C1 to charge it. The collector current flowing through the transistor Q1 during the conduction period thereof will energize the second plunger 27 through the switch means S6 and S7 and the switch means S1 is then switched from the contacts $b$ to $a$. Thus, the plunger 27 is supplied with a current from the power source 15 even after the transistor Q1 has turned into a nonconductive condition, and a self-holding of the plunger 27 is provided. Upon energization of the second plunger 27, the lever 96 is turned counterclockwise with respect to the pin 95 through the spring 98 and the rewinding idler 99 is pressed against the driving drum 83, so that the reel table 81 is rotated and thus the magnetic tape 8 is rewound. At the same time, the braking levers 85 and 86 are moved away by the tab 94 of the L-shaped lever 92 upon counterclockwise rotation thereof, and braking action is removed against compressive force of the springs 89 and 90. The reel table 81 is driven through the rewinding idler 99, the driving belt 103, the pulleys 101, 102, the driving belt 112, the pulley 110, the flywheel 109 and the driving belt 108 by the motor 107.

When the L-shaped lever 92 is turned slightly counterclockwise as a result of the energization of the second plunger 27, the spring 78, one end of which engages with one arm of the lever 92, is expanded and the actuating lever 75 is turned clockwise with respect to the pin 77 with the result that a hanging end thereof will push down the rear end of the rocking lever 52 as better seen from FIG. 6. The lever 52 is then pivotably moved and a front end thereof is pushed up. This causes the thin plate 57 attached on a lower side of the lever 52 to push up the lower end surface of the bearing portion 66 of the disk plate 61 so that the disk plate 61 may be brought into contact with the pulley 60 through the felt ring 62 therebetween. The bifurcated legs 52a and 52b of the rocking lever 52 compress the spring 64 to increase the contact pressure between the pulley 60 and the disk plate 61.

Upon close contact of the disk plate 61 with the pulley 60, since the latter is rotated through the driving belt 67, the pulleys 47, 48 and the driving belt 50 by the sub-pinch roller 41 frictionally rotated by the running magnetic tape 8, the disk plate 61 is also rotated together with the pulley 60. Namely, while the magnetic tape 8 is rewound, the pulley 60 and the disk plate 61 are also rotated together counterclockwise until the projection 63 provided on the lower side of the plate 61 pushes the thin plate 70 in its rotational direction. This causes the microswitch MS1 to be actuated so that the normally closed switch means S7 is opened and thus the second plunger 27 is energized. A rewinding operation is thus completed and the switch means S1 again returns from the contact $a$ to $b$. Because of deenergization of the second plunger 27, the force which has been pushing the disk plate 61 against the pulley 60 is removed and the plate 61 is separated from the pulley 60. The disk plate 61 is then rotated clockwise by means of the spring 64 disposed around the bearing portion 66 of the plate 61 until the projection 63 collides against the stop member 72.

The recording operation is accomplished in this way, but accompanied by a rewinding step of the magnetic tape at the end of the recording.

It is important to note that subsequent recording must be commenced after completion of the rewinding step of the magnetic tape. However, even if the starting lever 22 of the video camera 14 is triggered in error during the period of rewinding of the tape, since the second plunger 27 is in an energized condition and the switch means S1 is in contact with the contact $a$, the first plunger 26 is not in a position to be energized and accordingly a following recording operation cannot be started.

If a rewinding operation has been completed while the starting lever 22 of the video camera 14 is being pulled for starting the next recording, the switch means S1 is switched from the contact $a$ to $b$ due to deenergization of the second plunger 27 and therefore the first plunger 26 is again energized. This results in that the magnetic tape 8 running in a reverse or rewinding direction is subject to a force acting in the opposite direction for an instant and there is a fear that the tape may be expanded or severed.

The circuitry shown in FIG. 5 includes measures for removing such undesirable operation of the recorder.

Namely, when the first means S1 is switched from the contact $a$ to $b$ upon completion of tape rewinding operation, a current will flow through the coil winding of the first plunger 26 and also through the capacitor C2 and the resistor R5 to charge to capacitor C2. The current flowing through the first plunger 26 will provide a force large enough to maintain the main-pinch roller 38 in a pushing contact with the main-capstan 24, however not to provide a force large enough to bring the former into contact with the latter. When the voltage across the capacitor C2 is raised over the cutoff level or the threshold level of the transistor Q2, the same becomes conductive and the collector current thereof will flow through the resistor R7, R8, the resistor R9 and the base electrode of the transistor Q3. Conduction of the transistor Q2 is thus delayed from the completion of tape rewinding operation by the time required for the voltage appearing across the capacitor C2 to reach the threshold level of the transistor Q2. Since the base current of the transistor Q3 charges the capacitor C3, the current will cease upon completion of charging. The transistor Q3 is made conductive during such a charging period. As soon as the transistor Q3 is made conductive, the transistor Q4 is also made conductive and and additional current will flow through the upper half of the coil winding of the first plunger 26 only during the conduction period. As a result, the plunger 26 provides a force sufficient to push the main-pinch roller 38 against the main capstan 24. After a predetermined time base from completion of the tape rewinding operation, the main-pinch roller 38 is pushed against the main-pinch roller 24 and the magnetic tape 8 is transported in a normal direction and the following recording operation is commenced. This removes the fear of extension or severance of the magnetic tape 8.

If the starting lever 22 of the video camera 14 is pulled after completion of rewinding operation of the magnetic tape in order to start the preparation of a next recording, transportation of the magnetic tape in a normal direction is commenced only after a complete stoppage of running of the magnetic tape and accordingly there will be no fear of extension or severance of the tape. Therefore, there is no need for the transistor Q2 to operate with a delay. In more detail, the switch means S1 is switched from the contact $a$ to $b$ as soon as the rewinding operation is completed and a current begins to flow through the capacitor C2 to charge the same. After a certain period thereafter, the transistor Q2 is turned into a conduction state; however, since the starting lever 22 of the camera 14 has not yet been pulled, the switch means S3 is not closed. Therefore, both the transistors Q3 and Q4 are not made conductive and the first plunger 26 is not energized. Under these conditions, if the starting lever 22 is pulled to start the preparation of a new recording or the electronic editing, the transistors Q3 and Q4 are made conductive instantly, a large current will flow through the coil winding of the first plunger 26 for the time interval equal to the conduction period of the transistor Q3, so that the main-pinch roller 38 is urged against the main-capstan 24 to transport the magnetic tape 8 in a normal direction.

It is to be noted that the transistors Q2, Q3 and Q4 operate in the same way as described above when the first recording operation is started.

When the preparation of the second recording operation is entered into by pulling the starting lever 22 of the camera 14 during or after rewinding operation of the magnetic tape, the first plunger 26 is energized and the main and the sub-pinch rollers 38 and 41 are pushed against the main and the sub-capstans 24 and 23, respectively, so that the magnetic tape 88 is transported in a normal direction. It is important to note that the video tape recorder is put in a playback mode for a certain time interval from the commencement of tape running, within which the electronic editing is conducted. Since the video tape recorder is operating in a playback mode for the first certain time interval, the control head 7 picks up the control signals recorded on the magnetic tape 8 in the previous or the first recording operation and the control signals are applied to the phase comparator 11 of FIG. 1 through the switch SW1 which is connected to the contact $b$. In the phase comparator 11, the control signals are compared in phase with the vertical synchronizing signals contained in the new video signal to be recorded successively to the old video signal previously recorded on the magnetic tape 8, and the difference output between the signals serves to control the speed of the capstan motor M2 so that the phase of these two signals may be in phase with each other. As it is possible to know from experimentation how long it takes for the two signals to be in phase with each other after the second recording operation is commenced, such exact comparison of phases of the signals as described above is not actually conducted, but the video tape recorder is so arranged that the mode thereof is changed from playback to recording by switching means such as electronic switch combined with a delaying means, after the lapse of time, for example 0.6 second, experimentally determined from the commencement of a second recording operation. Such an electronic switch is preferably of an AND circuit. The change of mode of the video tape recorder means the change of mode of processing systems of video and audio signals such as magnetic control head, rotary video recording and playback, heads, video amplifying circuit, stationary audio recording and playback heads and erase heads, and servo systems from playback to recording. It is preferable that a recording current of the new video signal is increased for a time interval within which the old and the new video signals overlap each other after commencement of the second recording operation, in order to avoid a picture disturbance caused by a beat signal which may be produced by the old video signal remaining unerased on the magnetic tape. After a certain time interval has elasped after the commencement of the second recording operation, the switches SW1 and SW2 of FIG. 1 are switched from the contact $b$ to $a$ and, at the same time, the actual recording of the new video signal is commenced. Thus, the electronic assembly editing has been successfully accomplished.

Figures 8, 9:
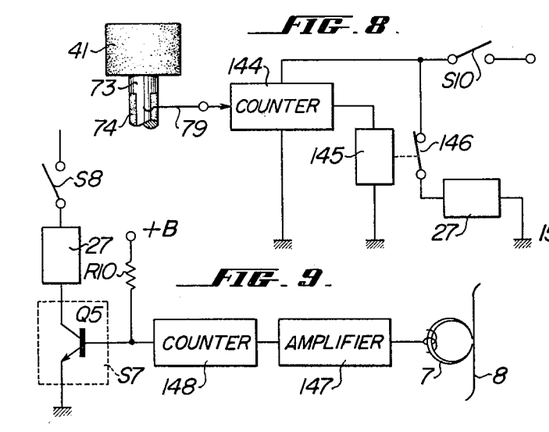
FIGS. 8, 9 and 10 are schematic illustrations of alternative mechanisms for electrically determining the length of the rewound magnetic tape.
Figure 10:
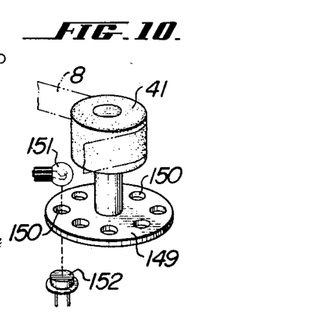

In the embodiment of the invention as illustrated in FIGS. 3 and 4, the tape rewinding period or rewound length of the magnetic tape is determined by a mechanical means, and the rewinding period setting means comprises the disk plate 61 adapted to engage with the pulley 60, the projection 63 provided on the plate 61 and the micro-switch MS1; however, such an electrical rewinding period setting means as shown in FIGS. 8 to 10 may be employed.

Referring now to FIG. 8, an insulator film 74 is attached on the metallic shaft 73 of the sub-pinch roller 41 leaving a metallic part thereon and a contact element 79 is arranged to contact with the shaft 73 to provide a rotary switch. When the magnetic tape 8 is rewound, the sub-pinch roller 41 is rotated in frictional contact with the tape 8, and a series of electric pulses whose number corresponds to the number of revolutions of the pinch roller 41 is picked up at the contact element 79. These pulses are applied to a counter 144 where the number of the pulses is counted and, when the number reaches a predetermined value, for example 8, a relay 145 is energized and the contact 146 thereof is opened, so that the second plunger 27 is deenergized. At the same time, a switch means S10 is opened and supply of the electric power to the counter 144 is cut out. The rotary switch as described above may be replaced by a permanent magnet arranged to rotate with the sub-pinch roller 41 and a reed switch operated by the magnet.

Another embodiment of the electrical rewinding period setting means is shown in FIG. 9. The switch means S7 consists of a transistor Q5 in a common-emitter configuration, and the base electrode of the transistor is supplied through an amplifier 147 and a counter 148 with a series of control signal pulses picked up by the control head 7 from the magnetic tape 8. When the number of the pulses supplied to the counter 148 reaches a predetermined value, an output is derived from the counter 148 and turns the transistor Q5 into a non-conductive condition which means opening the switch means S7. Thus, the second plunger 27 is deenergized. It is noted that the switch means S7 is supplied through a resistor R10 with a positive electric power +B. In this embodiment, the pulses to the counter 148 may be supplied from the pulses obtained by the rotary switch shown in FIG. 8 or a series of pulses produced by rotation of a disk plate 149 with several openings 150 interposed between an electric lamp 151 and a photosensitive element 152 positioned to receive a light therefrom. It is understood that all the pulses produced in response to the running of the rewound magnetic tape are usable to determine the rewinding period thereof.

The invention has been described hereinbefore with reference to the application in which the electronic editing is remotely controlled by the video camera, however, it is possible to realize the same electronic editing for recording of a television signal received on the air by means of manual switches instead of the video camera.

While the described embodiment represents the preferred form of the present invention, it is to be understood that modifications will occur to those skilled in the art without departing from the spirit of the invention. It is therefore to be understood that within the scope of the appended claims, the invention may be practiced otherwise than as specifically described herein.

What is claimed as new and desired to be secured by letters patent of the United States is:

1. Electronic editing circuitry for a video tape recorder to record a new video signal successively with respect to an old video signal prerecorded onto a magnetic tape without causing a disturbance of synchronism between the new and old video signals comprising:

means for reproducing control signals which were recorded on the magnetic tape coincidentally with the old prerecorded video signal, means for comparing the respective phases of the control signals and reference signals associated with synchronizing signals forming a part of the new video signal, means for controlling a servo system of the video tape recorder in response to the comparison in order to provide synchronism between the old and new video signals, means for recording the new video signal on the tape only when the synchronism is accomplished, means for increasing the recording current of the new video signal for the time interval within which new and old signals overlap after commencement of the second recording operation in order to avoid a picture disturbance caused by the old video signal remaining unerased on the magnetic tape, means for rewinding the magnetic tape by a predetermined length thereof immediately after the recording has been completed comprising a rewinding plunger, means for preventing the recording of the new video signal from starting during a rewinding period of the magnetic tape and immediately upon completion of the rewinding period, stopping means for stopping the rewinding of the magnetic tape, comprising:
a pulse generator for generating electric pulses whose number is in proportion to the rewound length of the magnetic tape,
a counter for counting the number of the electric pulses and deriving an output therefrom when the number reaches a predetermined value, and
a normally closed switch adapted to be opened by the output of the counter for deenergization of the rewinding plunger, means for moving the magnetic tape in a forward direction, means for delaying for a predetermined period the movement of the magnetic tape in a forward direction after the rewinding operation has been completed comprising:
a power source,
a winding plunger for actuating the means for moving the magnetic tape in a forward direction,
first switch means for connecting a terminal of the winding plunger to the power source when the rewinding operation has been completed,
second switch means adapted to connect the other terminal of the winding plunger to ground,
electrical delay means connected to the second switch means to maintain the second switch means open for a predetermined period after the first mentioned terminal of the winding plunger has been connected to the power source.

* * * * *

UNITED STATES PATENT AND TRADEMARK OFFICE
CERTIFICATE OF CORRECTION

PATENT NO. : 3,974,522
DATED : August 10, 1976
INVENTOR(S) : Fukatsu et al

It is certified that error appears in the above-identified patent and that said Letters Patent are hereby corrected as shown below:

Column 1, line 23, correct the spelling of "video".

Column 2, line 32, after "invention" insert --is--.

Column 3, line 5, after "starting" insert --during--.

Column 3, line 11, after "becomes" insert --better--.

Column 3, line 64, change "servc" to --servo--.

Column 5, line 36, after "which" insert --are--.

Column 5, line 40, after "larger" insert --diameter--.

Column 6, line 9, after "61" insert --so that the disk plate 61--.

Column 6, line 28, correct the spelling of "angle".

Column 7, line 10, correct the spelling of "diameter".

Column 11, line 16, delete "and", second occurence, and insert therefor --an--.

Signed and Sealed this

Fourteenth Day of December 1976

[SEAL]

Attest:

RUTH C. MASON
*Attesting Officer*

C. MARSHALL DANN
*Commissioner of Patents and Trademarks*